(12) United States Patent
Kim (10) Patent No.: US 7,992,482 B2
(45) Date of Patent: Aug. 9, 2011

(54) APPARATUS FOR CUTTING SUBSTRATE AND METHOD THEREOF

(75) Inventor: Jung Sik Kim, Chungcheongnam-do (KR)

(73) Assignee: LG Display Co., Ltd., Seoul (KR)

( * ) Notice: Subject to any disclaimer, the term of this patent is extended or adjusted under 35 U.S.C. 154(b) by 889 days.

(21) Appl. No.: 11/165,177

(22) Filed: Jun. 24, 2005

(65) Prior Publication Data

US 2006/0150788 A1 Jul. 13, 2006

(30) Foreign Application Priority Data

Dec. 27, 2004 (KR) ........................ 10-2004-0112867

(51) Int. Cl.
B26D 3/08 (2006.01)
B26D 7/06 (2006.01)
B26D 7/02 (2006.01)

(52) U.S. Cl. ................ 83/879; 83/886; 225/2; 225/96.5

(58) Field of Classification Search ................ 225/2, 94, 225/96, 96.5, 103, 104; 83/879, 862–863, 83/865, 861, 436.7

See application file for complete search history.

(56) References Cited

U.S. PATENT DOCUMENTS

| | | | | |
|---|---|---|---|---|
| 4,296,662 A | * | 10/1981 | Reed et al. | 83/880 |
| 4,694,722 A | * | 9/1987 | Collier et al. | 83/885 |
| 5,535,933 A | * | 7/1996 | Dickerson | 225/96.5 |
| 6,434,974 B1 | * | 8/2002 | Lisec | 65/174 |
| 6,557,689 B2 | * | 5/2003 | Gariglio | 198/345.1 |
| 2007/0051769 A1 | * | 3/2007 | Otoda et al. | 225/2 |

FOREIGN PATENT DOCUMENTS

| | | | |
|---|---|---|---|
| CN | 1386606 A | | 12/2002 |
| CN | 1496798 A | | 5/2004 |
| JP | H03-236757 | | 10/1991 |
| JP | H04-246618 | | 9/1992 |
| JP | 9-278470 A | | 10/1997 |
| JP | H09-286628 | | 11/1997 |
| JP | H09-289181 | | 11/1997 |
| JP | 11322069 A | * | 11/1999 |
| JP | 2002-233988 | | 8/2002 |
| JP | 2004010466 | | 1/2004 |
| JP | 2004026569 A | * | 1/2004 |
| JP | 2004-066636 | | 3/2004 |
| JP | 2004-224601 | | 8/2004 |
| KR | 10-2004-0058160 A | | 7/2004 |

* cited by examiner

*Primary Examiner* — Laura M. Lee (74) *Attorney, Agent, or Firm* — McKenna Long & Aldridge, LLP.

(57) ABSTRACT

An apparatus for cutting a substrate includes first and second belt conveyers for conveying the substrate thereon, a scriber for scribing the substrate along a cutting-reserved line, the scriber provided between the first and second belt conveyers and being spaced apart from the first and second belt conveyers, and a substrate support for securing the substrate, the substrate support provided between the first and second belt conveyers along a scribing direction of the substrate.

7 Claims, 8 Drawing Sheets

APPARATUS FOR CUTTING SUBSTRATE AND METHOD THEREOF

The present invention claims the benefit of Korean Patent Application No. P2004-112867 filed in Korea on Dec. 27, 2004, which is hereby incorporated by reference.

BACKGROUND OF THE INVENTION

1. Field of the Invention

The present invention relates to a liquid crystal display device and, more particularly, an apparatus for cutting a substrate and method thereof. Although the present invention is suitable for a wide scope of applications, it is particularly suitable for cutting a liquid crystal display mother substrate.

2. Discussion of the Related Art

Since the information communication field is developing rapidly, display devices for disposing and displaying information are actively being developed. A cathode ray tube (CRT) has been popular as an information display due to its excellent screen brightness and capability of displaying various colors. However, as the demand for wide-screen, portability and high resolution rises, many recent efforts have been made to research and develop flat panel displays to replace the heavy and large CRT.

Flat panel displays, such as liquid crystal display (LCD) devices, plasma display panel (PDP) devices, electroluminescent display (ELD) devices and vacuum fluorescent display (VFD) devices have been the focus of recent research because of their excellent characteristics of light weight and low power consumption. These flat panel displays have wide applications in computers, airplanes, spaceships and the like. In addition, a plurality of unit flat panel display devices can be fabricated in one manufacturing process by forming semiconductor chips of a large scale integrated circuit and the like in a matrix form on a brittle substrate and cutting the substrate into device units.

In cutting a brittle substrate of glass, silicon, ceramic or the like, there are a dicing method using a 50~200 μm thick diamond blade, which is rotating at a high speed, to form a cutting groove on the substrate, and a scribing method using a diamond scribing wheel of 0.6~2 mm thick to form a cutting groove on a surface of the substrate. In the dicing method, because the blade is considerably thinner than the scribing wheel, the dicing method is suitable for cutting a substrate having thin film or prominences on its surface.

However, since a frictional heat is generated at a zone that is being cut by the blade, the blade cutting is carried out by supplying a coolant or cooling water to the corresponding zone and it is difficult to completely remove the coolant after completion of dicing. Thus, if moisture remains due to the incomplete removal of the cooling water, it is highly probable that any metal parts will corrode. Thus, the dicing method is not suitable for a flat panel display including metal parts, such as a metal electrode layer, a metal terminal and the like. In addition, a cutting time of the dicing method is longer than that of the scribing method, thereby lowering productivity. In contrast, the scribing method does not require coolant or cooling water to enhance throughput of product, and the cutting time of the scribing method is shorter than that of the dicing method, thereby increasing productivity.

Figure 1:
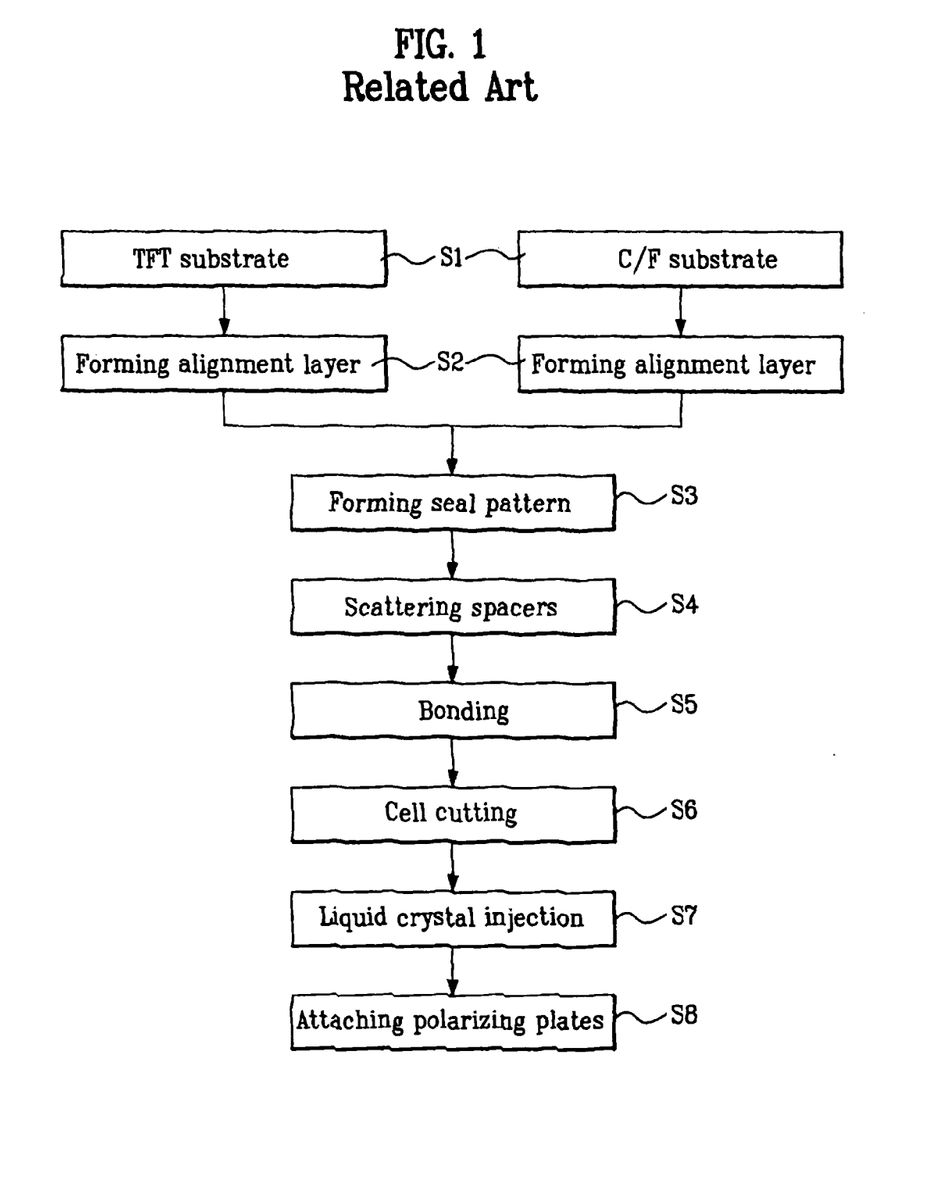
FIG. 1 is a flowchart of a general process for fabricating a liquid crystal display panel.

FIG. 1 is a flowchart of a general process for fabricating a liquid crystal display panel. In FIG. 1, at step S1, a thin film transistor (TFT) array substrate having a plurality of transistors and a color filter substrate including a color filter are separately prepared. For example, the TFT array substrate is prepared by depositing and patterning a plurality of layers, including pixel electrodes, on a first substrate. Because the number of masks are used in patterning the layers, many efforts have been made to lower the number of masks to reduce fabrication cost. The color filter substrate is prepared by sequentially forming an R/G/B color filter and a common electrode. The color filter is formed by dyeing, printing, pigment dispersion or electrophoretic deposition. The pigment dispersion is widely used for forming the color filter.

Subsequently, at step S2, alignment layers are respectively formed on the TFT array substrate and the color filter substrate. The alignment layers are formed by coating a polymer film and rubbing the polymer film. The polymer film is commonly formed of a polyimide-based organic substance, and the rubbing process is used to align the alignment layer. The rubbing process, which includes the step of rubbing the alignment layer in a predetermined direction using a rubbing cloth, is suitable for mass production and is advantageous in facilitating a control of the pretilt angle with stable alignment. Recently, a photo alignment method using a polarized light is developed and used.

At step S3, a seal pattern is formed on one of the TFT array substrate and the color filter substrate. The seal pattern is located at a periphery of a display area and includes a gap for liquid crystal injection. The seal pattern also prevents leakage of the injected liquid crystal molecules. The seal pattern is formed by forming a thermo-hardening resin with a predetermined pattern using a screen print method or a seal dispenser method.

At step S4, spacers uniform in size are scattered on one of the TFT array substrate and the color filter substrate to maintain a uniform and fine gap between the TFT array substrate and the color filter substrate. The spacers are scattered by wet scattering with a mixture of spacers and alcohol and the like or dry scattering by spraying spacers only. Dry scattering is divided into electrostatic scattering using static electricity and non-electric scattering using a gas pressure. Since the liquid crystal display device is vulnerable to static electricity, non-electric scattering is widely used.

At step S5, the TFT array substrate and the color filter substrate are loaded in a bonding chamber and are bonded to each other by pressurizing and hardening the seal pattern. As a result, the TFT array substrate and the color filter substrate are arranged with the alignment layers on the TFT array and color filter substrates facing each other and the pixel electrode facing the color filter in one-to-one manner.

At step S6, the bonded substrates are cut into a plurality of unit LCD (liquid crystal display) panels. In general, a plurality of unit LCD panels, each of which corresponds to one LCD, are formed on one substrate that will be separated into a plurality of the LCD panels to enhance fabricating efficiency and to reduce manufacturing costs. In the LCD panel cutting process, the scribing method is used. In particular, a scribe line is formed on a surface of a substrate using a scribing wheel of diamond having hardness higher than that of a glass substrate or a laser application to generate a crack in a substrate thickness direction.

At step S7, liquid crystal molecules are injected between the alignment layers of the bonded substrates to form a liquid crystal layer. The liquid crystal injection is carried out by vacuum injection using a difference between inner and outer pressures of the LCD panel. When the liquid crystal molecules are injected in the LCD panel, air amongst the liquid crystal molecules creates bubbles within the LCD panel that cause device failure. To prevent the bubble generation, a process of removing the bubbles by leaving the liquid crystal molecules in a vacuum state for a considerable time is needed. After completion of the liquid crystal injection, the inlet is sealed to prevent the liquid crystals from flowing out via the inlet. In this case, the inlet is blocked in a manner of coating a UV-hardening resin on the inlet using a dispenser and hardening the coated resin by UV-ray application.

At step S8, polarizing plates are respectively attached to each outer surface of the above-prepared LCD panel and a driving circuit is connected to the LCD panel to complete the liquid crystal display device.

A substrate cutting method and apparatus according to a related art are explained with reference to the attached drawings as follows.

Figure 2A:
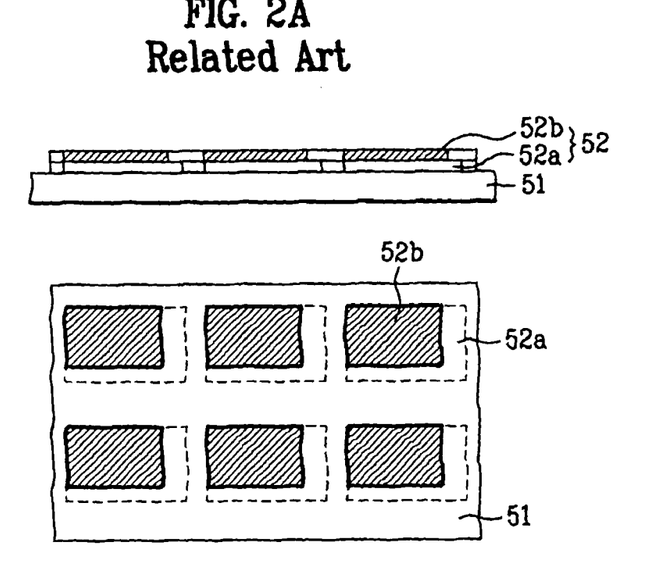
FIGS. 2A to 2F are diagrams illustrating a sequence of cutting a mother substrate into unit LCD panels according to the related art.

FIGS. 2A to 2F are diagrams illustrating a sequence of cutting a mother substrate into unit LCD panels according to the related art. FIGS. 2A to 2F illustrate six LCD panels (e.g., 18.1" each) arranged on a mother substrate (e.g., 1,000 mm×1,200 mm). Referring to FIG. 2A, a bonded mother substrate 52 is loaded on a table 51 of a loader. The bonded mother substrate 52 includes a TFT substrate 52a and a C/F (color filter) substrate 52b. In FIG. 2A, an upper figure indicates a cross-sectional diagram of the mother substrate 52 loaded on the table 51, and a lower figure indicates a layout of the mother substrate 52 loaded on the table 51.

Figure 2B:
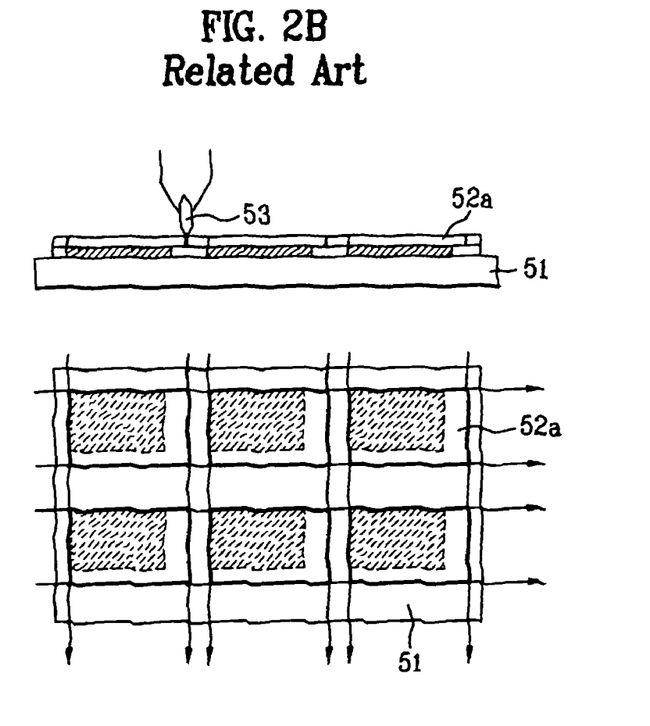

Referring to FIG. 2B, the mother substrate 52 is inversed such that the TFT substrate 52a is placed on a topside. Subsequently, a diamond based wheel 53 having hardness higher than a glass substrate is aligned on a cutting-reserved line of the TFT substrate 52a. The wheel 53 is then rotated and moved to form a crack having a predetermined depth in a direction of a long or short axis (shown as arrows) of the TFT substrate 52a.

Figure 2C:
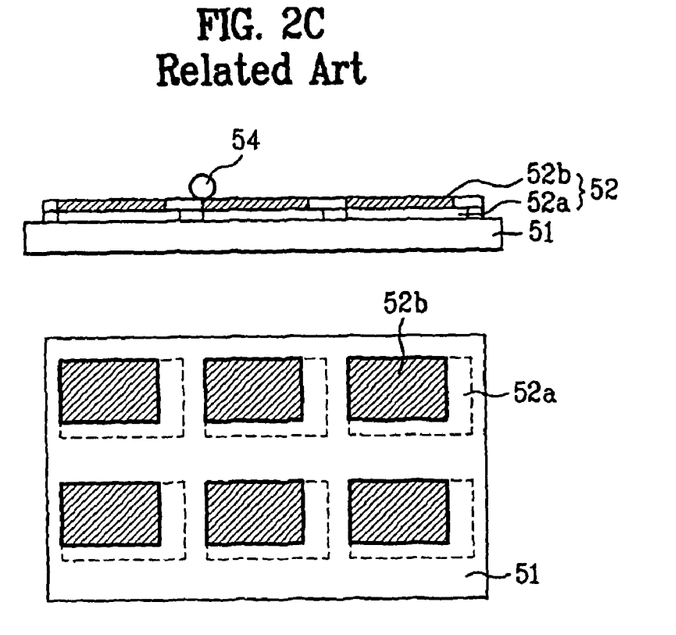

Referring to FIG. 2C, the mother substrate 52 is inversed again such that the C/F substrate 52b is placed on a topside. A break bar 54 is then aligned on the C/F substrate 52b. By pressurizing the break bar 54, the crack formed having the predetermined depth on the TFT substrate 52a is fully cut to separate the TFT substrate 52a into unit LCD panels.

Figure 2D:
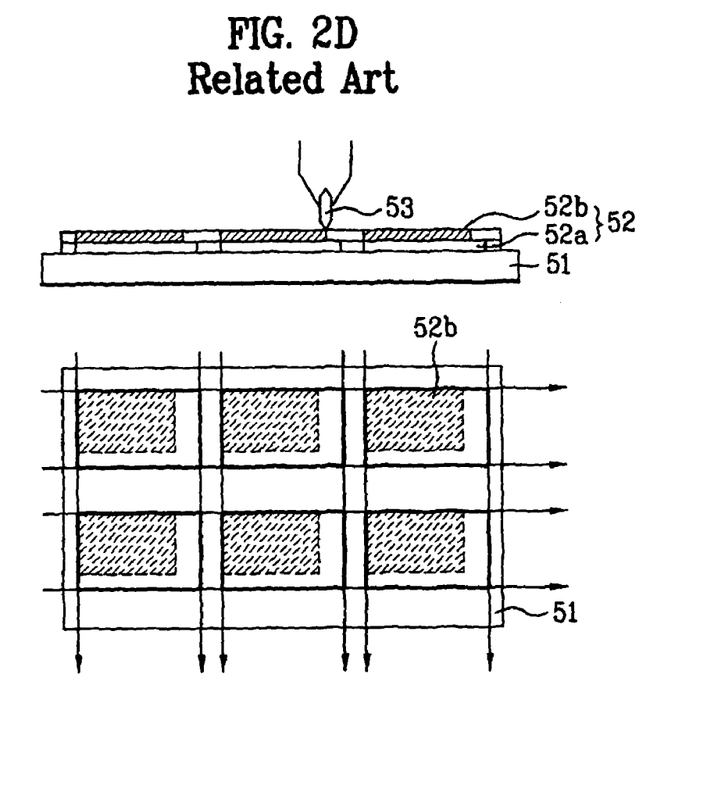

Referring to FIG. 2D, the wheel 53 is aligned on a cutting-reserved line of the C/F substrate 52b. The wheel 53 is then rotated and moved to form a scratch having a predetermined depth in a direction of a long or short axis (shown as arrows) of the C/F substrate 52b.

Figure 2E:
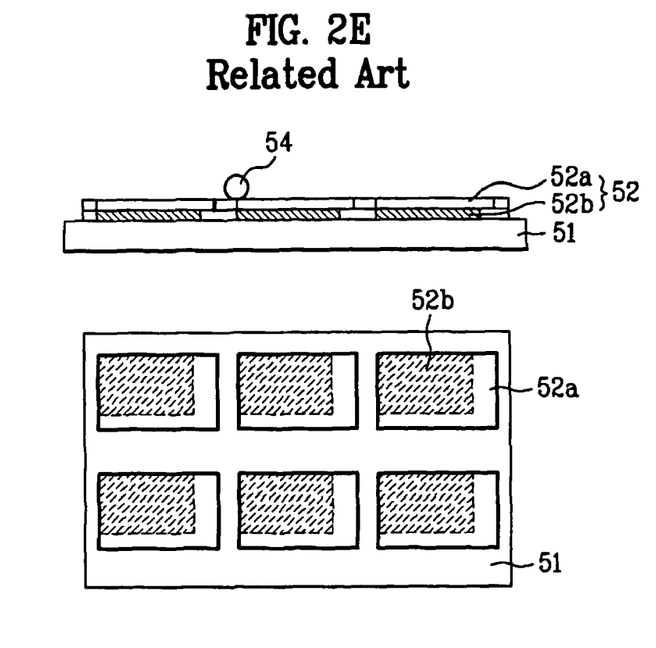

Referring to FIG. 2E, the mother substrate 52 is inversed again such that the TFT substrate 52a is placed on a topside. The break bar 54 is then aligned on the TFT substrate 52a. By pressurizing the break bar 54, the crack formed having the predetermined depth on the C/F substrate 52b is fully cut to separate the C/F substrate 52b into unit LCD panels. After completion of the LCD panel separation, an unnecessary dummy substrate is removed.

Figure 2F:
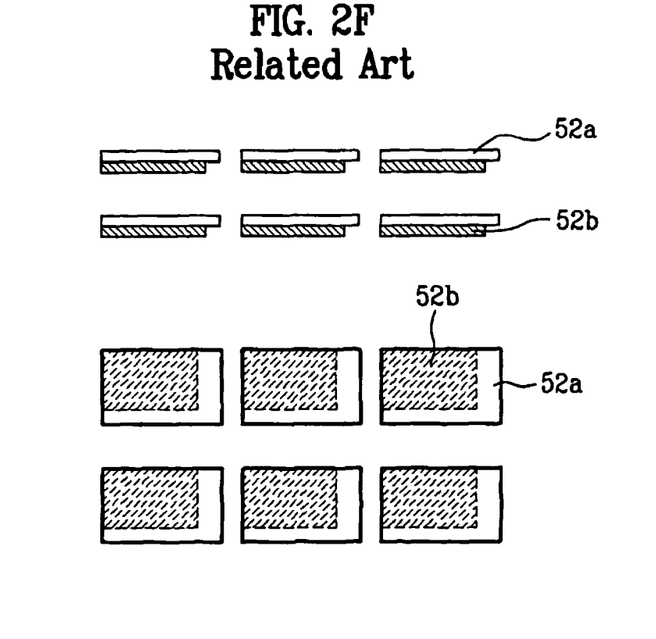

Referring to FIG. 2F, the substrates of the unit LCD panels are unloaded once using a suction plate (not shown in the drawing) to be carried and prepared for the next process.

Figure 3A:
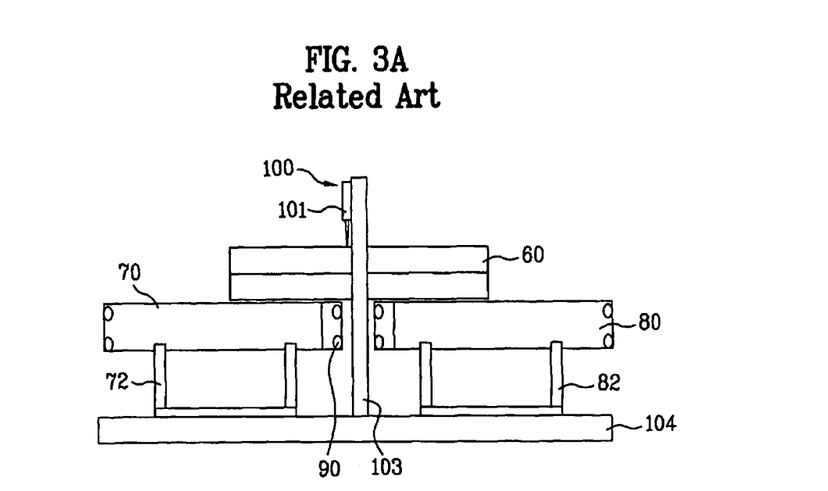
FIG. 3A is a cross-sectional diagram illustrating a substrate cutting apparatus according to the related art.
Figure 3B:
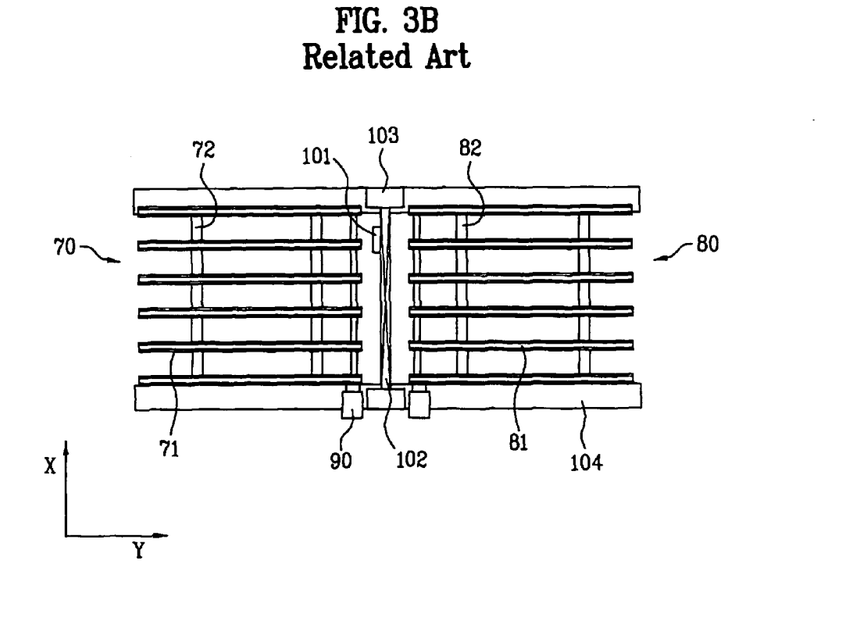
FIG. 3B is a plane view illustrating the substrate cutting apparatus shown in FIG. 3A.

FIG. 3A is a cross-sectional diagram illustrating a substrate cutting apparatus according to the related art, and FIG. 3B is a plane view illustrating the substrate cutting apparatus shown in FIG. 3A. In FIG. 3A and FIG. 3B, a substrate cutting apparatus includes first and second belt conveyers 70 and 80 arranged with a predetermined distance spaced apart from each other to load and convey a mother substrate 60 to be cut. The substrate cutting apparatus also includes servo motors 90 provided at ends of the first and second belt conveyers 70 and 80 to drive the first and second belt conveyers 70 and 80, respectively, and a scriber 100 provided between the first and second belt conveyers 70 and 80 to perform a scribing along a cutting-reserved line on the substrate 60.

The first belt conveyer 70 includes a plurality of conveyer support beams 71 arranged in a Y-axis direction to be evenly spaced apart from each other and a plurality of beam support bar frames 72 arranged in an X-axis direction to support the conveyer support beams 71. Similarly, the second belt conveyer 80 includes a plurality of conveyer support beams 81 arranged in the Y-axis direction to be evenly spaced apart from each other and a plurality of beam support bar frames 82 arranged in the X-axis direction to support the conveyer support beams 81. In addition, the scriber 100 includes a scribe head 101, a guide bar 102 having the scribe head 101 attached thereto, a pair of support bars 103 respectively supporting both sides of the guide bar 102, and a pair of guide rails 104 arranged in parallel to secure the support bars 103.

A substrate cutting method using the above-configured related art substrate cutting apparatus is explained as follows. First, the substrate 60 loaded on the first belt conveyer 70 is moved in one direction as the first belt conveyer 70 is driven by the servo motor 90. Subsequently, if a cutting-reserved line of the moved substrate 60 is placed between the first and second belt conveyers 70 and 80 (one end of the substrate 60 is placed on the first belt conveyer 70 and the other end of the substrate 60 is placed on the second belt conveyer 80), the scribe head 101 is actuated to move in a direction perpendicular to the moving direction of the substrate 60 to perform a scribing process along the cutting-reserved line of the substrate 60.

After the scribed substrate 60 is completely conveyed to the second belt conveyer 80 from the first belt conveyer 70, a new substrate is loaded on the apparatus to perform the scribing process on the newly loaded substrate. Subsequently, the scribed substrate is separated into unit LCD panels via a break process.

The related art substrate cutting apparatus and method have the following problems. First, vibration is generated from the scribing process or the guide rails. In particular, since the support beams and the belt conveyers have elasticity higher than that of other supports, the vibration is transferred thereto. Subsequently, the generated vibration is transferred to the substrate such that the substrate is separated in the middle of the scribing process. Hence, it is unable to carry out the scribing process on a next substrate smoothly.

In addition, in the X-axis scribe of the related art, the scribe damage is not formed to the uniform depth due to the belt interval and shaking by the conveyer support beam arranged in the Y-axis direction. Such a damage depth is further varied due to unevenness of the belt conveyer. Thus, a portion having the high damage depth may be separated in the middle of the scribing process. Further, the conveyer support beam and the beam support bar frame are deformed due to the vibration that twists the conveyer leveling.

SUMMARY OF THE INVENTION

Accordingly, the present invention is directed to an apparatus for cutting a substrate and a method thereof that substantially obviate one or more of the problems due to limitations and disadvantages of the related art.

An object of the present invention is to provide an apparatus for cutting a substrate and method thereof that prevent against vibration of belt conveyers and conveyer support beams to enhance productivity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for cutting a substrate includes first and second belt conveyers for conveying the substrate thereon, a scriber for scribing the substrate along a cutting-reserved line, the scriber provided between the first and second belt conveyers and being spaced apart from the first and second belt conveyers, and a substrate support for securing the substrate, the substrate support provided between the first and second belt conveyers along a scribing direction of the substrate.

In another aspect, a method of cutting a substrate includes the steps of: loading the substrate, conveying the substrate by actuating first and second belt conveyers so that a cutting-reserved line of the substrate is positioned between the first and second belt conveyers, aligning a substrate support along a scribing direction under the substrate, and scribing the substrate along the cutting-reserved line of the substrate while the substrate support securing the substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4A:
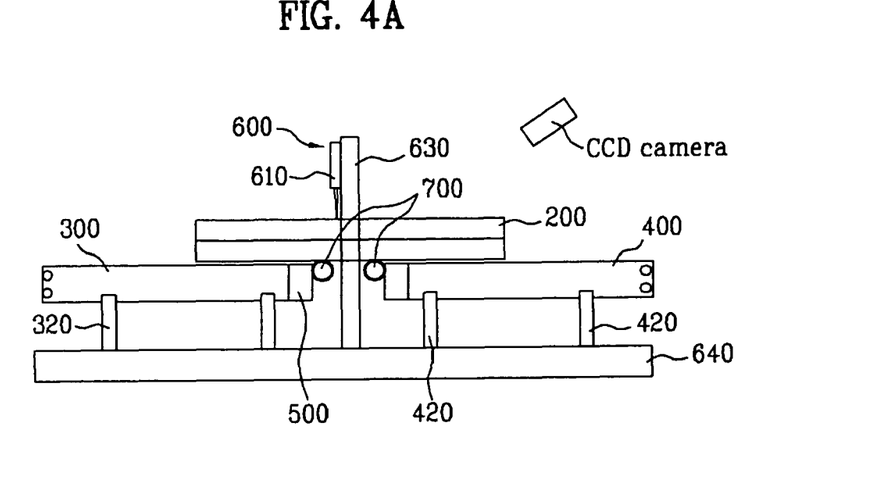
FIG. 4A is a cross-sectional diagram illustrating an exemplary substrate cutting apparatus according to an embodiment of the present invention.
Figure 4B:
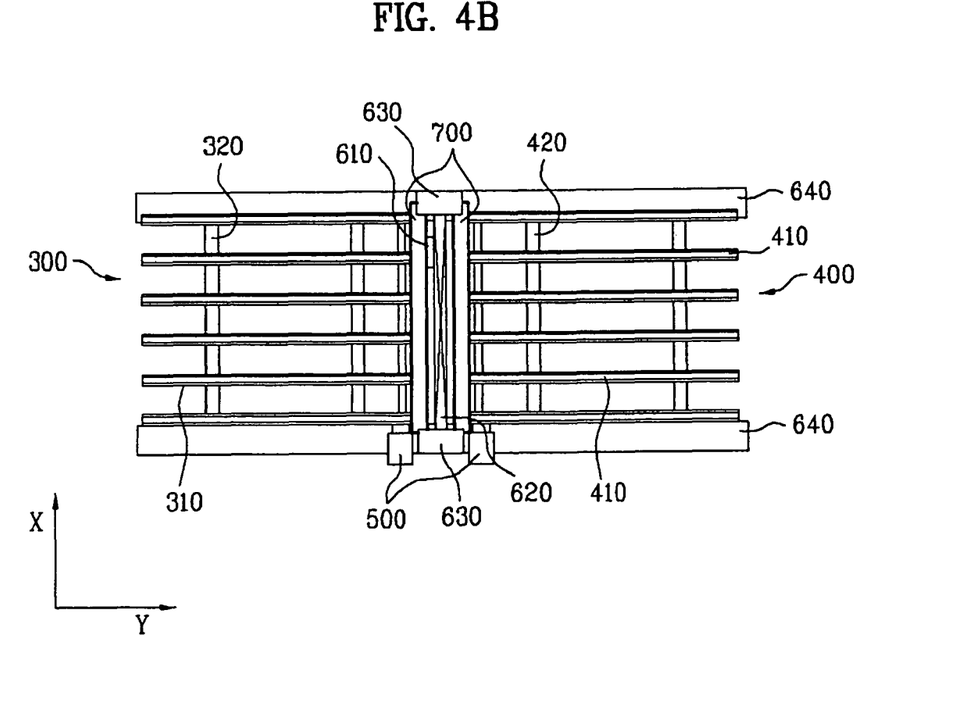
FIG. 4B is a plane view illustrating the substrate cutting apparatus shown in FIG. 4A.

FIG. 4A is a cross-sectional diagram illustrating an exemplary substrate cutting apparatus according to an embodiment of the present invention, and FIG. 4B is a plane view illustrating the substrate cutting apparatus shown in FIG. 4A. Referring to FIG. 4A and FIG. 4B, a substrate cutting apparatus includes first and second belt conveyers 300 and 400 arranged with a predetermined distance spaced apart from each other to load and convey a mother substrate 200 to be cut. For example, the first and second belt conveyers 300 and 400 may be spaced apart from each other by about 15 cm. The substrate cutting apparatus also includes driving units 500 provided at ends of the first and second belt conveyers 300 and 400 to drive the first and second belt conveyers 300 and 400, respectively, a scriber 600 provided between the first and second belt conveyers 300 and 400 to perform a scribing along a cutting-reserved line on the substrate 200, and a substrate support 700 provided between the first and second belt conveyer 300 and 400.

The first belt conveyer 300 includes a plurality of conveyer support beams 310 arranged in a Y-axis direction to be evenly spaced apart from each other and a plurality of beam support bar frames 320 arranged in an X-axis direction to support the conveyer support beams 310. Similarly, the second belt conveyer 400 includes a plurality of conveyer support beams 410 arranged in the Y-axis direction to be evenly spaced apart from each other and a plurality of beam support bar frames 420 arranged in the X-axis direction to support the conveyer support beams 410. In particular, the first and second belt conveyers 300 and 400 may have symmetrical structures.

The scriber 600 includes a scribe head 610, a guide bar 620 having the scribe head 610 attached thereto, a pair of support bars 630 respectively supporting both sides of the guide bar 620, and a pair of guide rails 640 arranged in parallel to secure the support bars 630. For example, when the first and second belt conveyers 300 and 400 are spaced apart by about 15 cm, the scribe head 610 may be spaced apart from the first belt conveyer 300 by about 7 cm.

The substrate support 700 is arranged in a same direction as a scribing direction of the mother substrate 200 to support the mother substrate 200 in performing the scribing along the cutting-reserved line on the mother substrate 200. Thus, the substrate support 700 is arranged in a vertical direction to the first and second conveyer support beams 310 and 410. In particular, the substrate support beams 700 supports the mother substrate 200 against the vibration generated from the scribing process or the movement on the guide rails 640, and can prevent the scribing error caused by the first and second conveyer support beams 310 and 410.

The substrate support 700 includes a rod, a lift pin, a finger, a plate or the like, and preferably may include a rod having a rotatable roller shape. The substrate support 700 may be configured to enable a vertical movement. For example, when the mother substrate 200 reaches a cutting position, the substrate support 700 is lifted upward to support the mother substrate 200 during the scribing process. Then, after completion of the scribing process, the substrate support 700 is lowered. Thus, by detecting that the mother substrate 200 arrives at the cutting-reserved line using sensors attached to the scriber 600 or prescribed portions of the first and second belt conveyers 300 and 400, the scribing process can be effectively carried out in a manner of controlling the scriber 600 or the substrate support 700.

The drive units 500 include a driver including one of an actuator, a step motor, a servo motor and the like. The scriber 600 includes a cutter wheel tip or a laser oscillator outputting a laser beam for scribing the substrate. For example, the cutter wheel tip may be formed of a diamond based material, and the laser beam may be one of $CO_2$ laser, YAG laser and femtosecond laser. Alternatively, a pair of scribers 600 may be provided to perform the scribing process on upper and lower parts of the mother substrate 200 simultaneously. Optionally, a CCD camera (not shown in the drawing) can be used in monitoring a status of the scribing process while the mother substrate 200 is scribed.

Figure 5A:
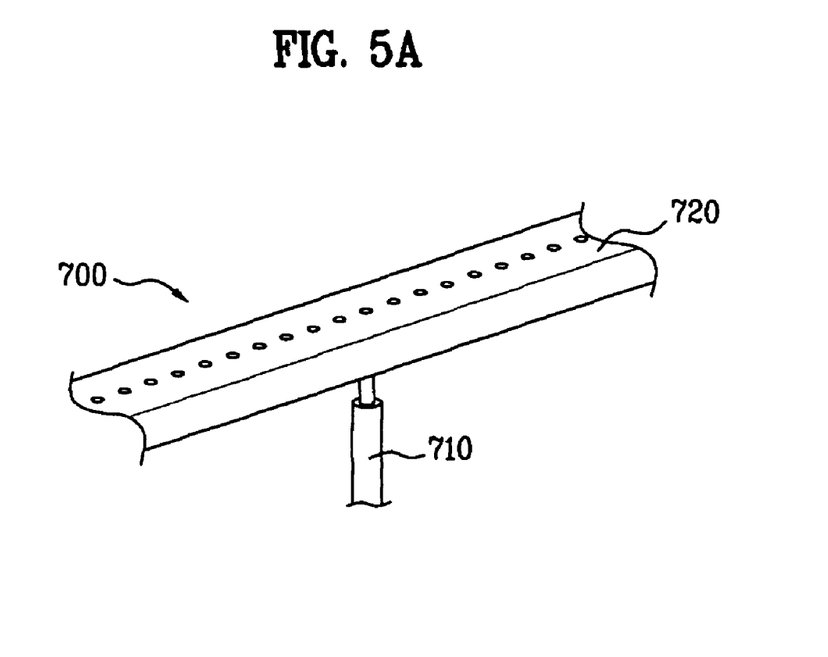
FIGS. 5A to 5E are diagrams illustrating the substrate support shown in FIGS. 4A and 4B according to different embodiments of the present invention.
Figure 5B:
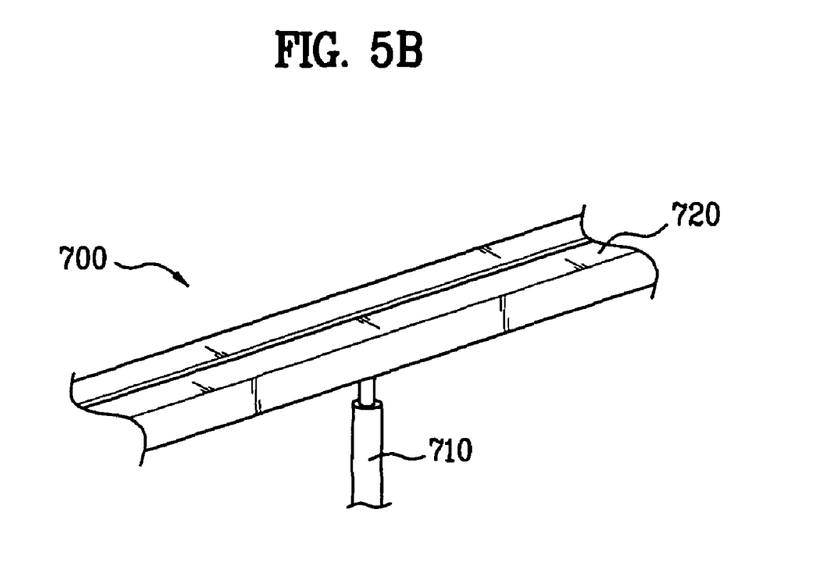

FIGS. 5A to 5E are diagrams illustrating the substrate support shown in FIGS. 4A and 4B according to different embodiments of the present invention. Referring to FIG. 5A and FIG. 5B, the substrate support 700 includes a lift shaft 710 and a supporter 720 to support the substrate 200. A suction plate is provided to the supporter 720 to fix a substrate thereto by suction. The suction plate may include a plurality of curved minute suction plates (as shown in FIG. 5A) or a longitudinal suction tape (as shown in FIG. 5B) in an extending direction of the supporter 720. In performing the scribing, the substrate support 700 supports the mother substrate using the supporter 720 and selectively controls the lift shaft 710 to enable an ascent and a descent.

Figure 5C:
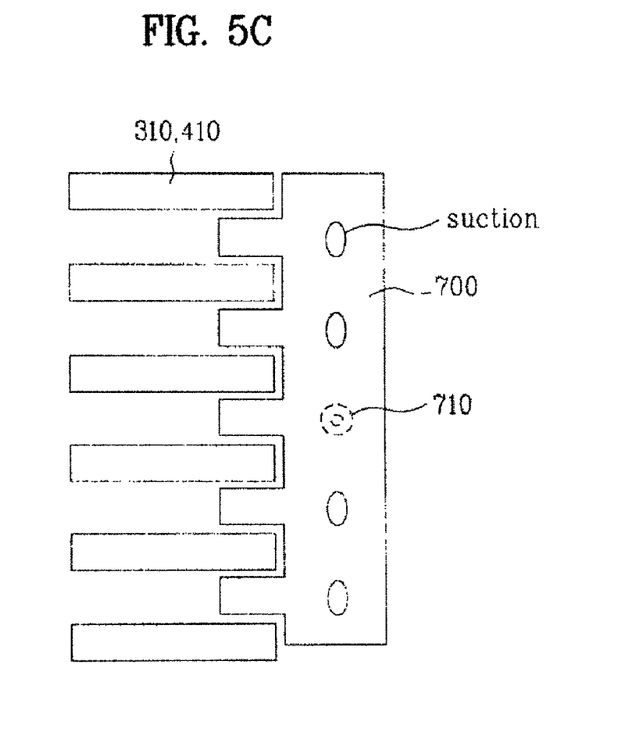

Referring to FIG. 5C, in another embodiment of the present invention, the substrate support 700 has a plurality of protruding portions alternately disposed between the conveyer support beams 310 or 410. For example, the substrate support 700 have a finger shape. The finger-shaped substrate support 700 is configured to correspond to the gaps between the first conveyer support beams 310 or to correspond to the gaps between the second conveyer support beams 410. Although not shown, the figure-shaped substrate support 700 includes a suction plate for fixing the conveyed substrate thereto by suction.

Figure 5D:
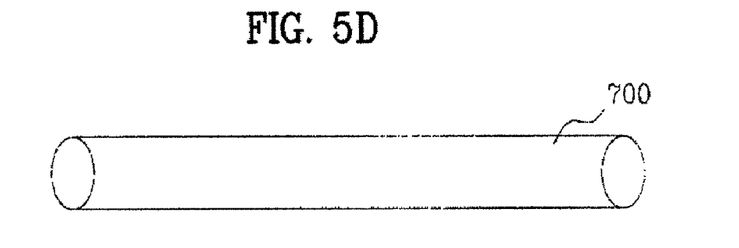
Figure 5E:
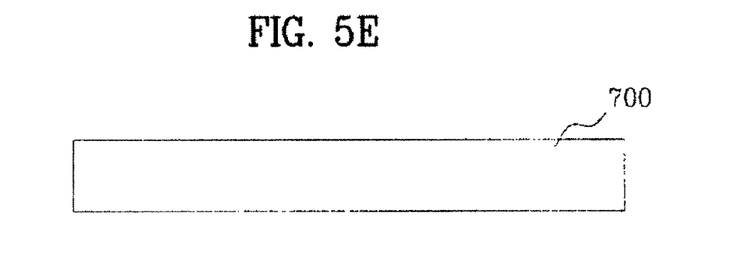

Referring to FIG. 5D, in yet another embodiment of the present invention, the substrate support 700 has a rod shape. The rod-shaped substrate support 700 may be rotatable. Referring to FIG. 5E, in another embodiment of the present invention, the substrate support 700 has a plate shape.

A substrate cutting method using the above-configured substrate cutting apparatus according to an embodiment of the present invention is explained as follows. First, the mother substrate 200 to be cut is loaded on the first belt conveyer 300. The first belt conveyer 300 is actuated by the drive unit 500 to convey the mother substrate 200 in one direction. Subsequently, if one side end of the conveyed mother substrate 200 is loaded on the first belt conveyer 300 and if the other side end of the mother substrate 200 is loaded on the second belt conveyer 400, the substrate support 700 is aligned to be placed under the mother substrate 200.

For example, sensors (not shown) may be used to detect that the mother substrate 200 arrives at the cutting-reserved line, and when the mother substrate 200 arrives at the cutting-reserved line, the substrate support 700 may be ascended by adjusting the lift shaft 710 to contact and to secure the mother substrate 200 thereon. In particular, the substrate support 700 is controlled to be automatically placed under the mother substrate 200 via the detecting sensors attached to the scriber 600 or the first and second belt conveyers 300 and 400 when the cutting-reserved line of the other substrate 200 arrives at a predetermined position.

While the substrate support 700 is aligned with the mother substrate 200, the scribing process is executed along the cutting-reserved line on the mother substrate 200 using the scribe head 610 of the scriber 600. Optionally, a CCD camera (not shown in the drawing) attached to a prescribed portion of the scriber 600 can be used in monitoring a status of the scribing process while the mother substrate 200 is scribed.

Subsequently, the scribed substrate is separated into unit LCD panels via a break process. The break process is carried out in a manner of forming a crack by applying hot steam to the substrate on which the crack is formed to a prescribed depth by the scribing process or applying a prescribed pressure to the cracked substrate using an instrument, such as a roller and the like.

Accordingly, the apparatus for cutting a substrate according to an embodiment of the present invention includes the substrate support in the scribing direction to prevent the scribing error from the vibration generated from the scribing process or the movement via the guide rails, thereby enhancing productivity.

It will be apparent to those skilled in the art that various modifications and variations can be made in the apparatus for cutting a substrate and the method thereof of the present invention without departing from the spirit or scope of the invention. Thus, it is intended that the present invention covers the modifications and variations of this invention provided they come within the scope of the appended claims and their equivalents.

What is claimed is:

1. An apparatus for cutting a substrate, comprising:
   first and second belt conveyers for conveying the substrate thereon, the first and second belt conveyers arranged with a predetermined distance spaced apart from each other;
   a scriber for scribing the substrate along a cutting-reserved line, the scriber provided between the first and second belt conveyers and being spaced apart from the first and second belt conveyers; and
   a substrate support for securing the substrate, the substrate support provided between the first and second belt conveyers along a scribing direction of the substrate, and
   a sensor provided at one of the scriber, the first belt conveyer and the second belt conveyer for detecting a position of the substrate,
   wherein the cutting-reserved line is positioned between the first and second belt conveyers,
   wherein the substrate support secures the substrate thereon by suction,
   wherein the substrate support is arranged in a direction vertical to a first and second conveyer support beams provided within the first and second belt conveyers, and wherein the substrate support has a plurality of protruding portions alternatively disposed with the first and second conveyer support beams, with a finger shape, and corresponding to gaps between one of the first and second conveyer support beams,
   wherein the substrate support beams supports the mother substrate against the vibration generated from the scribing process or the movement on guide rails,
   wherein the substrate support is lifted upward to support the substrate in performing the scribing process when the mother substrate reaches a cutting position and after completion of the scribing process the substrate support is lowered,
   wherein the substrate support includes a lift shaft and a supporter, and the substrate support is movable in a vertical direction by adjusting the lift shaft, and
   wherein when the scriber performs scribing, the substrate support supports the mother substrate using the supporter and selectively controls the lift shaft to enable an ascent and descent.

2. The apparatus of claim 1, wherein the substrate support is movable in a vertical direction.

3. The apparatus of claim 1, wherein the scriber includes one of a cutter wheel tip and a laser.

4. The apparatus of claim 3, wherein the laser includes one of a CO2 laser, a YAG laser and a femtosecond laser.

5. The apparatus of claim 1, further comprising a CCD camera provided at a prescribed portion of the scriber for monitoring a status of a scribing process.

6. The apparatus of claim 1, further comprising a driver for driving the first and second belt conveyers.

7. The apparatus of claim 6, wherein the driver includes one of an actuator, a step motor and a servo motor.

* * * * *